United States Patent [19]

Martin et al.

[11] Patent Number: 4,644,608

[45] Date of Patent: Feb. 24, 1987

[54] THIGH DEBONER

[75] Inventors: Eugene G. Martin, New Holland; Dale M. Risser, Denver, both of Pa.

[73] Assignee: FoodCraft Equipment Company, Inc., New Holland, Pa.

[21] Appl. No.: 570,914

[22] Filed: Jan. 16, 1984

[51] Int. Cl.[4] ............................................. A22C 25/16
[52] U.S. Cl. .......................................... 17/46; 17/11
[58] Field of Search ....................... 17/1 G, 11, 46, 52

[56] References Cited

U.S. PATENT DOCUMENTS

| | | | |
|---|---|---|---|
| 2,897,536 | 8/1959 | Bergstrom et al. | 17/46 |
| 3,347,680 | 10/1967 | Rambold | 17/46 |
| 3,348,261 | 10/1967 | Segur | 17/1 G |
| 4,016,624 | 4/1977 | Martin et al. | 17/52 |
| 4,020,528 | 5/1977 | Lindbladh et al. | 17/50 |
| 4,327,463 | 5/1982 | Martin | 17/1 G |
| 4,359,807 | 11/1982 | Adkison et al. | 17/1 R |
| 4,373,232 | 2/1983 | Harding et al. | 17/11 |
| 4,385,421 | 5/1983 | Martin | 17/52 |
| 4,402,112 | 9/1983 | Gasbarro | 17/1 G |
| 4,557,017 | 12/1985 | Gasbarro | 17/46 |

*Primary Examiner*—Frederick R. Schmidt
*Assistant Examiner*—Robert Showalter
*Attorney, Agent, or Firm*—Price, Heneveld, Cooper, DeWitt & Litton

[57] ABSTRACT

An apparatus and method for removing the meat from the bone of a poultry thigh or other poultry piece having an elongated bone, includes a conveyor for moving the poultry piece along its longitudinal axis. A peel-down assembly extends along the conveyor and defines a passage or slot through which the piece passes. The meat is peeled or folded along the sides of the bone until the meat is secured to the bone along a lower longitudinal edge thereof. A cutting assembly is positioned downstream from the peel-down assembly to sever the meat from the bone along the longitudinal edge.

40 Claims, 20 Drawing Figures

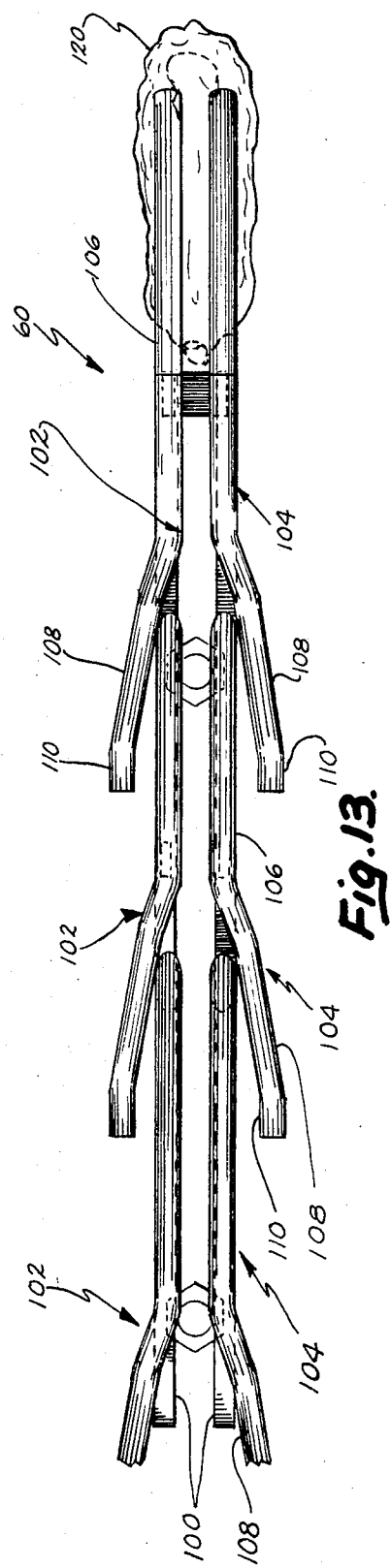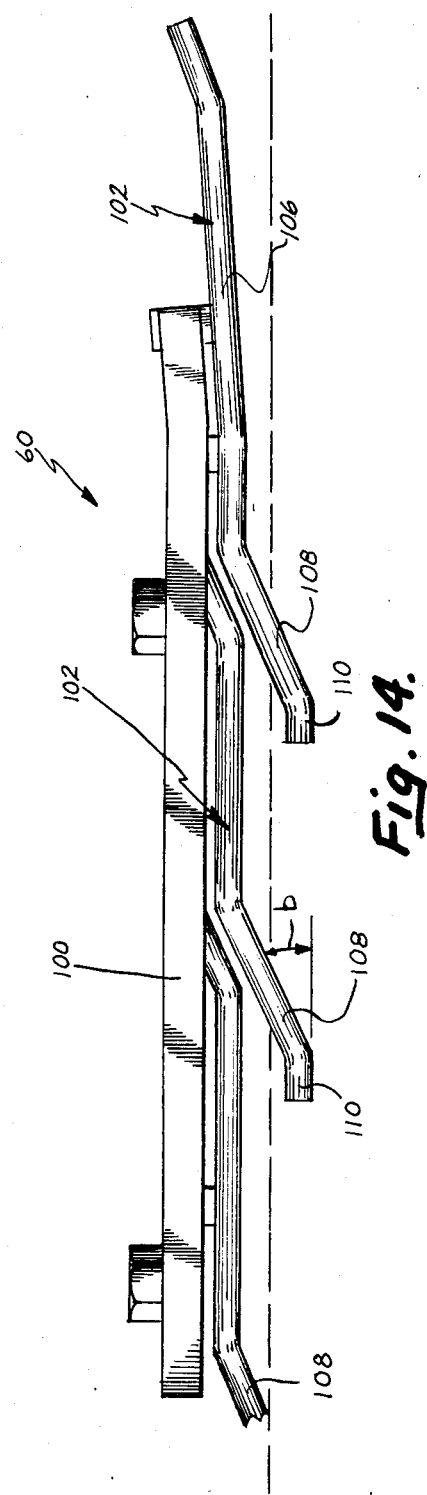

THIGH DEBONER

BACKGROUND OF THE INVENTION

The present invention relates to an apparatus and a method for deboning poultry pieces and more particularly to a unique apparatus for removing the meat from an elongated bone of a poultry thigh piece, leg and the like.

Various methods and machines have been used to separate an eviscerated poultry carcass into its various component pieces or parts for subsequent processing, packaging and sale. The cut-up operations typically involve removal of the meat components from the carcass. Cut-up and deboning operations have been and continue to be performed by hand. The eviscerated carcasses may be mounted on shackles along a processing line. The component parts are removed by manual cutting. The parts may be subsequently processed to remove the meat from the bones.

As the demand for poultry parts and deboned meat parts has increased, various machines have been developed for the automatic cut up and deboning of poultry carcasses. Examples of automatic cut-up machines may be found in U.S. Pat. No. 4,016,624 entitled POULTRY CUT-UP MACHINE and issued on Apr. 12, 1977 to Eugene Martin et al and U.S. Pat. No. 4,385,421 entitled POULTRY LEG/BACK PROCESSOR and issued on May 31, 1983 to Eugene G. Martin. The machine of U.S. Pat. No. 4,385,421 automatically separates the poultry leg sections from the back of the carcass. Removal of the meat from the leg sections, if desired, is accomplished by subsequent deboning operations.

A machine which has been developed for deboning poultry legs, thighs and the like may be found in U.S. Pat. No. 4,327,463 entitled SINGLE STATION ANATOMICAL SECTION DE-BONING MACHINE and issued on May 4, 1982 to Eugene G. Martin. The machine of this patent includes a gripper blade assembly which engages and retains an end of the bone. A head deboning assembly includes a set of blades through which the bone is pulled by the gripper blade assembly. The deboning assembly in effect pulls the bone out of the meat portion or peels the meat back along the longitudinal axis of the elongated bone.

Another approach to deboning poultry parts may be found in U.S. Pat. No. 4,402,112 entitled AUTOMATIC POULTRY DEBONING APPARATUS and issued on Sept. 6, 1983 to Geno N. Gasbarro. This patent discloses an apparatus which uses an array of high pressure fluid streams to separate the meat from the bone portion of a poultry leg and thigh. The fluid streams are disposed along the path of travel of a conveyor. The streams impinge upon the leg or thigh portion to remove the meat.

Prior approaches have not been readily adaptable to different types of poultry such as chicken or turkeys. Also, the prior machines have been relatively complex and/or have not achieved the desired maximum removal of the meat from the bones. The water jet approaches also present problems with excessive water absorption by the meat which can make the meat components unacceptable.

SUMMARY OF THE INVENTION

In accordance with the present invention, a unique apparatus and method are provided for peeling and folding the meat down the lateral sides of an elongated bone and then cutting or severing the meat from the bone on a continuous, progressive basis. Essentially, the apparatus includes means for conveying the poultry part longitudinally. Provision is made to engage the poultry part and progressively fold or peel the meat until it is retained along a longitudinal edge of the bone. A cutting means severs the meat from the bone.

In a presently preferred form, the poultry part is initially fed into a hold-down assembly. A longitudinal edge of the part is scored and initial progressive folding or peeling down of the meat is accomplished. The part then passes into a finish peel-down assembly which removes the meat along the lateral sides of the bone. The part then engages a ramp assembly which defines a slot. The bone passes over the ramp and the peeled down meat passes through the slot. The meat is then severed by a rotary cutting blade which overlies the slot between the bone and the top surface of the ramp.

The progressive peeling or folding of the meat down along the lateral sides of the longitudinally moving bone removes substantially all of the meat from the irregularly shaped bones of the poultry pieces. The cutting assembly, including the ramp and rotary blade, cleanly severs the meat from the bone. The meat falls into a catch pan and the bone is conveyed out of the discharge end of the apparatus.

BRIEF DESCRIPTION OF THE DRAWINGS

FIG. 13 is a bottom, plan view of a hold-down bar subassembly incorporated in the present invention;

FIG. 14 is a fragmentary, side-elevational view of the hold-down subassembly;

DETAILED DESCRIPTION OF THE PREFERRED EMBODIMENT

Figure 1:
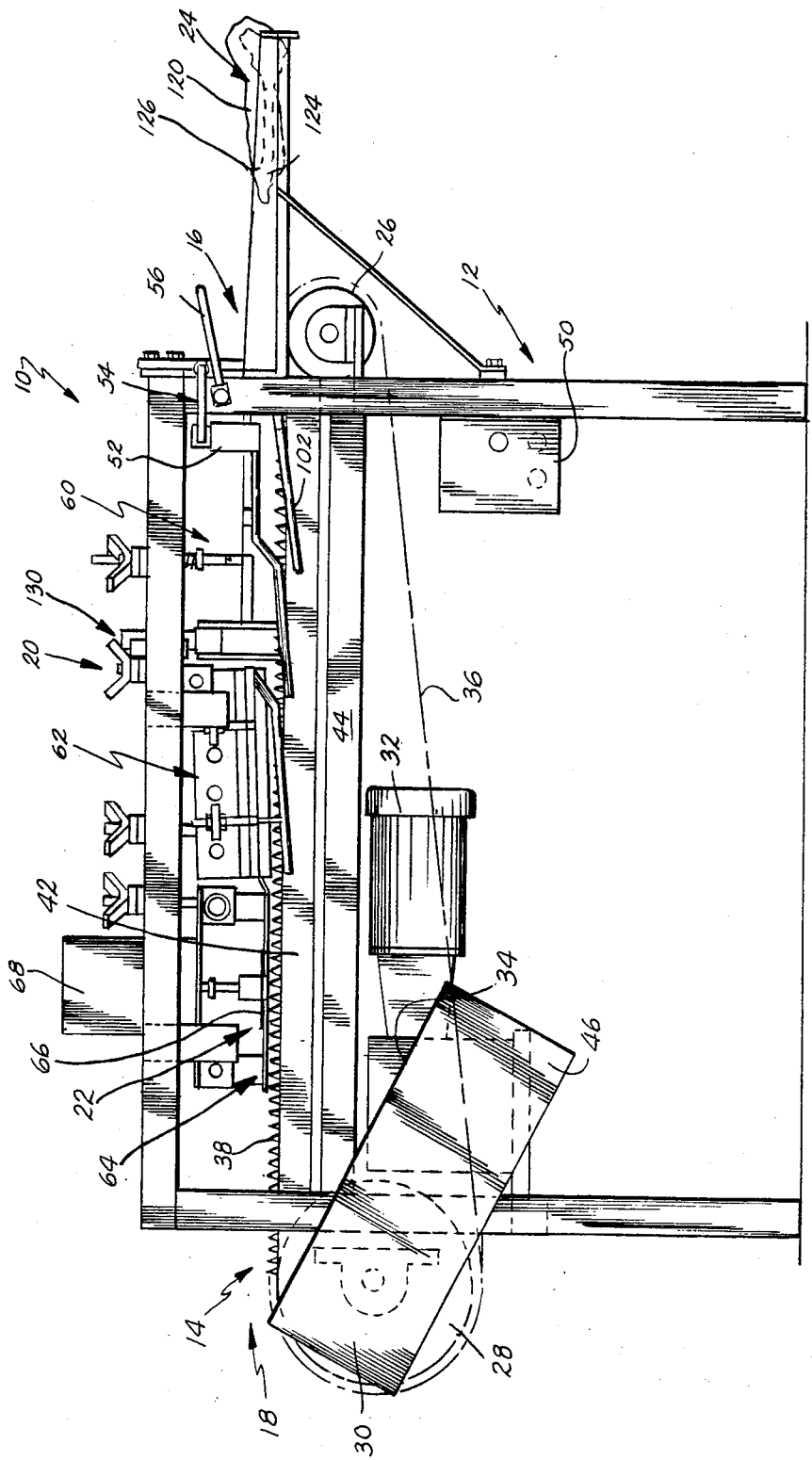
FIG. 1 is a side, elevational view showing the basic layout of a deboning apparatus in accordance with the present invention.

A preferred embodiment of the deboner apparatus in accordance with the present invention is illustrated generally in FIG. 1 and designated by numeral 10. Apparatus 10 includes an elongated frame 12 which supports a conveyor 14 having feed end 16 and discharge end 18. Also supported on the frame is a peel-down or fold-down subassembly generally designated 20 and a cutting subassembly generally designated 22. Supported at feed end 16 of apparatus 10 is a feed tray 24.

Conveyor 14 is of the endless, flexible, chain type. Conveyor 14 includes a sprocket 26 rotatably mounted adjacent the feed end 16 and a driven sprocket 28 enclosed within chain guard 30. Sprocket 28 is driven by a suitable motor 32 through a speed reducer 34. Extending around sprockets 26, 28 is an endless roller chain schematically shown in FIG. 1 and designated 36. Chain 36 along the side plates thereof includes a plurality of generally V-shaped dogs 38. The conveyor, therefore, includes two spaced, parallel rows of dogs 38. The dogs, as explained in more detail below, engage the poultry piece to transport the piece through the peel-down subassembly 20 and the cutting subassembly 22 along an upper run of chain 36. Arrow A in FIGS. 3, 4, 5, 6, 7 and 9 indicates the direction of travel of chain 36.

Supported on frame 12 and extending the length of the frame below the upper run of the conveyor is a chain guide 42. Chain guide 42 is preferably formed from a USDA approved ultra high molecular weight plastic. Supported on frame 12 below chain guide 42 is a catch pan 44. A discharge chute 46 is supported on frame 12 at discharge end 18. Suitable controls are mounted on frame 12 within a liquid-tight control box 50. Also supported on frame 12 is a safety limit switch 52 having a limit switch lever 54 which engages a panic stop bar 56. As described in more detail below, peel-down assembly 20 includes hold-down subassembly 60 and a final or finish peel-down or squeegee subassembly 62. Cutting subassembly 22 includes a ramp or plate structure 64 and a rotary cutting blade 66 driven by a suitable motor 68.

Figure 2:
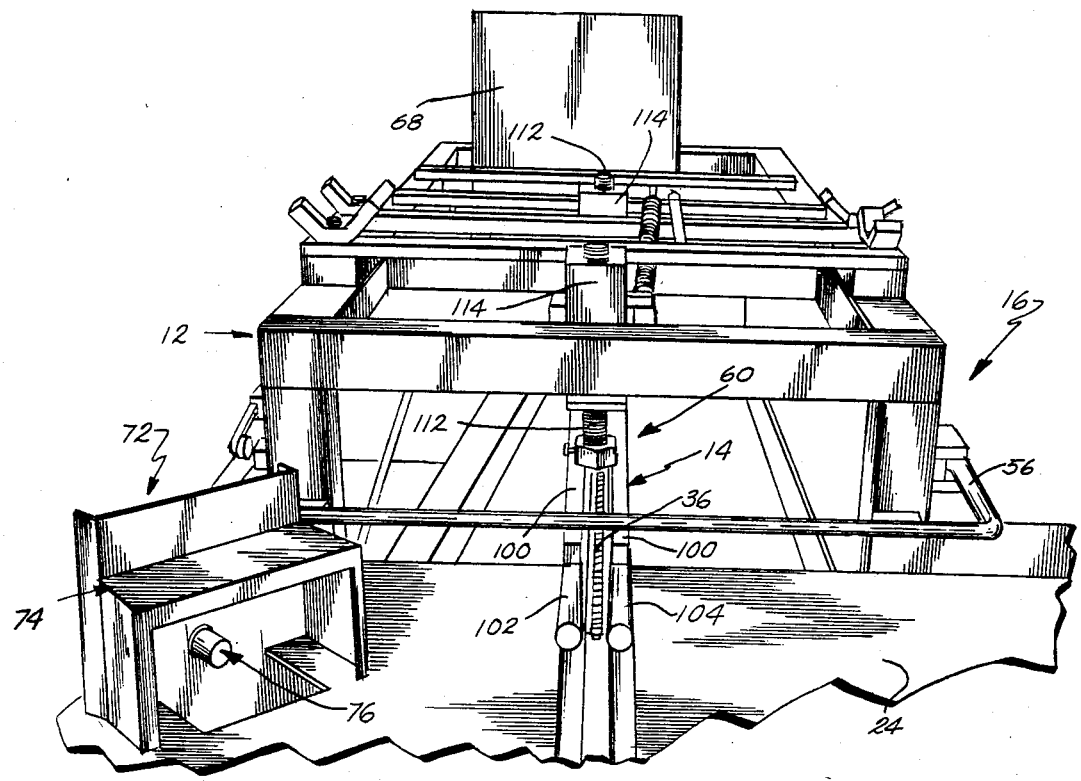
FIG. 2 is a perspective, end view of the feed end of the apparatus.
Figure 3:
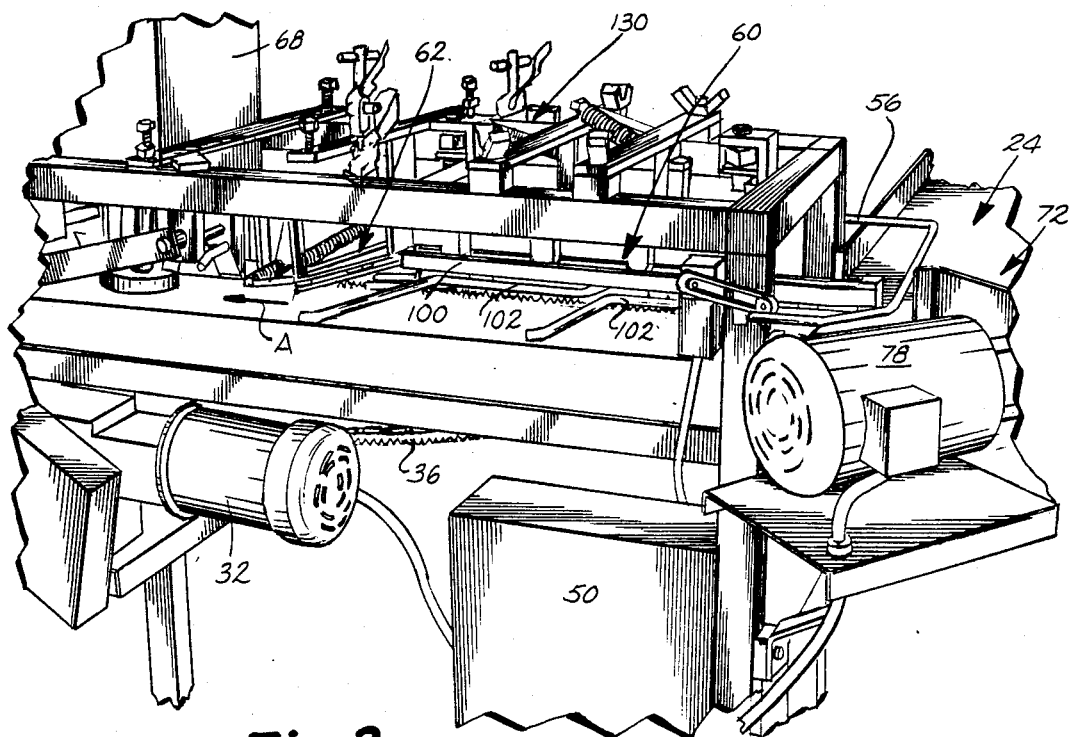
FIG. 3 is a fragmentary, perspective view showing the left side of the apparatus.
Figure 11:
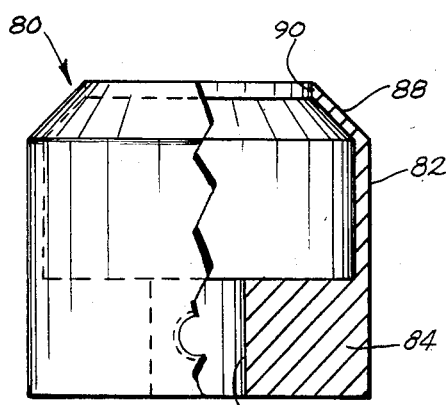
FIG. 11 is a fragmentary, partially sectioned view of a cup knife.
Figure 12:
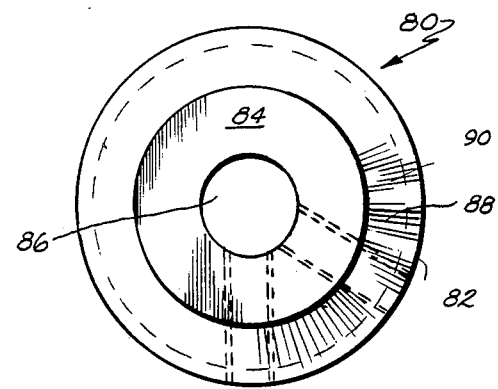
FIG. 12 is a plan view of the cup knife of FIG. 11.

As seen in FIGS. 2 and 3, feed tray 24 supports a tendon or cup knife subassembly 72. Subassembly 72 includes a support plate and guard structure 74 through which a drive shaft 76 of a drive motor 78 extends. Shaft 76 supports and rotates a rotary cup knife 80 illustrated in FIGS. 11 and 12. Cup knife 80 includes a cylindrical portion 82 joined to base 84. Base 84 defines a bore 86. Knife 80 is secured to shaft 76 by a suitable set screw. Knife 80 includes an inwardly angled flange or truncated cone portion 88. Portion 88 defines a cup blade 90. As explained in more detail below, when the apparatus is used to debone a poultry thigh piece, such as a turkey thigh, the large end of the thigh bone is inserted into the cup knife 80 to loosen meat from the large end thereof and sever the tendons at such end of the bone. This increases the meat yield. Edge 90 of the knife cuts into the tendons and meat along the end of the bone.

HOLD-DOWN SUBASSEMBLY

Hold-down subassembly 60 is best seen in FIGS. 2, 3, 13 and 14. Subassembly 60 includes parallel, elongated support or mounting plates 100. Secured to plates 100 are a plurality of paired, tandemly arranged hold-down bars or guide rods 102, 104, each pair including a bar 102 and a bar 104. As seen in FIGS. 13 and 14, each bar 102, 104 includes an elongated, generally straight portion 106 joined to an intermediate, downwardly and outwardly angled portion 108 which in turn is joined to a trailing or free portion 110. Bars 102, 104 are supported on frame 12 from plates 100 so as to extend longitudinally along and immediately adjacent the sides of conveyor chain 36. This is best seen in FIGS. 2 and 3. Subassembly 60 is vertically adjustable on frame 12 by threaded members 112 received in frame cross pieces 114. The vertical spacing, therefore, of rods 102, 104 above conveyor chain 36 may then be adjusted to accommodate different size poultry parts.

As schematically illustrated in FIGS. 1 and 13, a poultry part such as a turkey thigh piece 120 is fed into the machine with a small end 122 of bone 124 entering the apparatus first. The so-called white knuckle 126 of the small end is positioned so as to extend upwardly into the slot defined by the spaced bars 102, 104. As piece 120 is fed into the machine, a lower longitudinal surface of the bone is engaged by the drive dogs 38. Subassembly 60 holds the piece in engagement with the conveyor so that it moves through the machine. As the piece enters the machine and engages the downwardly angled portions 108 of each pair of guide bars 102, 104, meat on the piece is initially folded or peeled down along the lateral sides of bones 124 due to the wiping or contact action of portions 108 on the piece.

SCORING KNIVES

Figure 4:
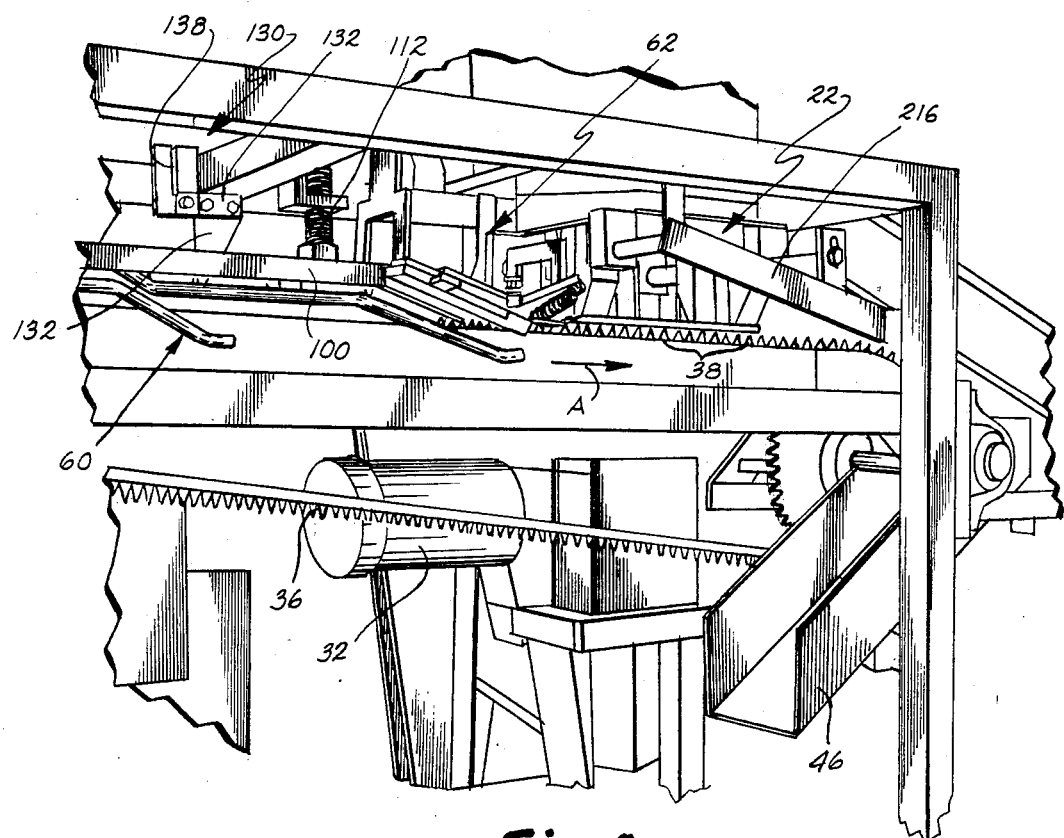
FIG. 4 is a fragmentary, right side perspective view of the apparatus.
Figure 5:
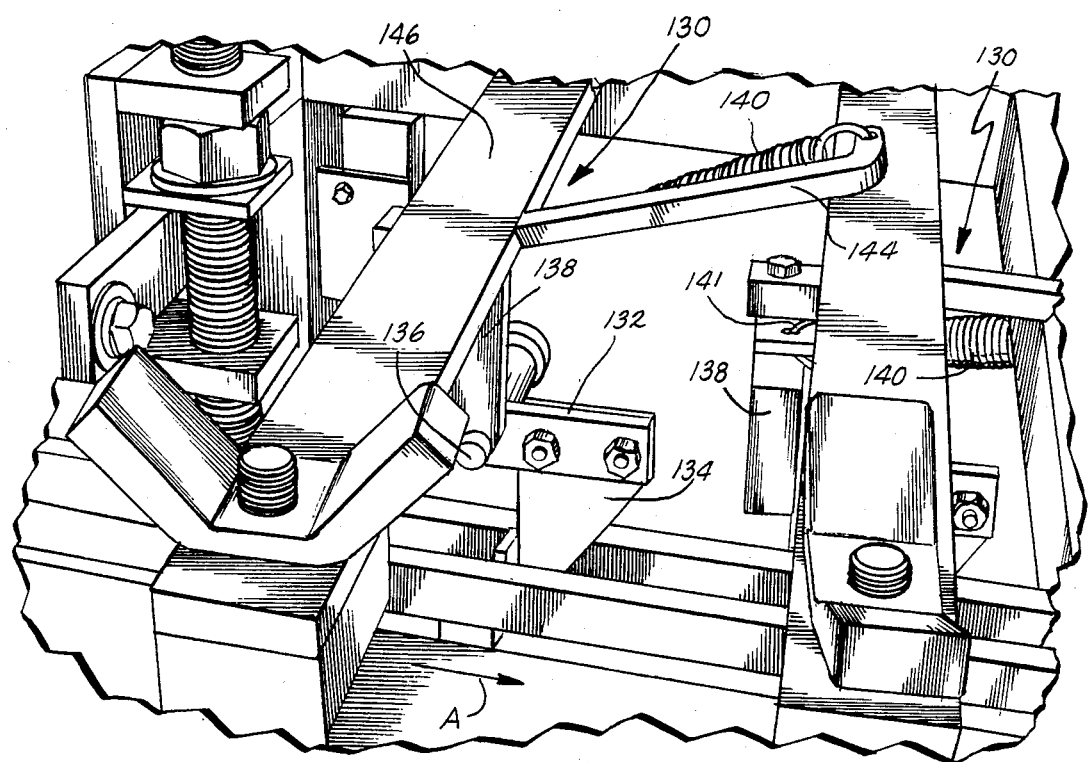
FIG. 5 is a fragmentary, perspective view showing the scoring knives of the apparatus.

In order to assist in the initial peel down of the meat from the part as it passes through subassembly 60, at least one scraper or scoring blade assembly, schematically illustrated in FIG. 1 and designated 130, is supported on frame 12. As best seen in FIGS. 3, 4 and 5, it is presently preferred that a pair of tandemly arranged scraper blade or scoring knife assemblies 130 be supported on frame 12. Each scoring knife subassembly includes a knife holder 132 supporting a knife 134. Knife holder 132 is rotatably supported on a pivot pin or axle 136. A lever 138 is joined to holder 132. An upper end of lever 138 is engaged by a coil spring 140 at an end 141 of the spring. An opposite end 142 of the coil spring is fixed to a bracket 144 secured to a frame cross piece 146. Blade 132 extends towards the conveyor chain 36 between the support plates 100 of subassembly 60. Blades 132 overlie the longitudinal axis of poultry part 120. As the poultry piece passes through subassembly 60, knives 132 engage and scrape or score an upper longitudinal edge of the piece. This aids in the initial peel down action accomplished by the hold-down rods 102, 104. Knives 132 insure more complete removal or folding down of the meat from the bone.

SQUEEGEE OR FINAL PEEL-DOWN SUBASSEMBLY

Figure 6:
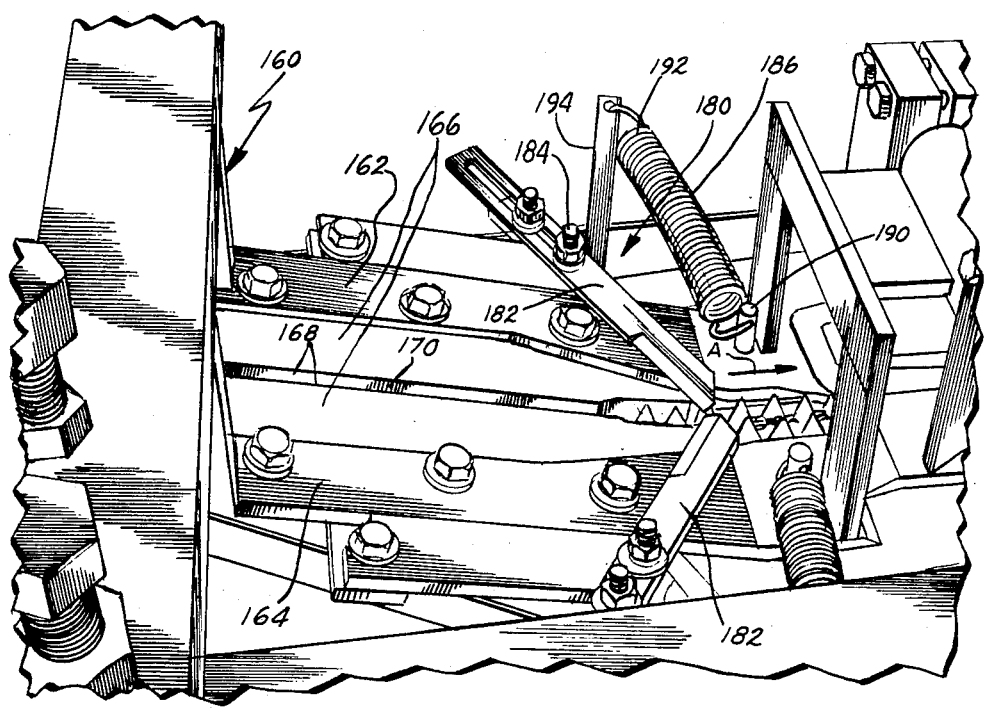
FIG. 6 is a fragmentary, perspective view showing a portion of the peel-down subassembly incorporated in the present invention.
Figure 15:
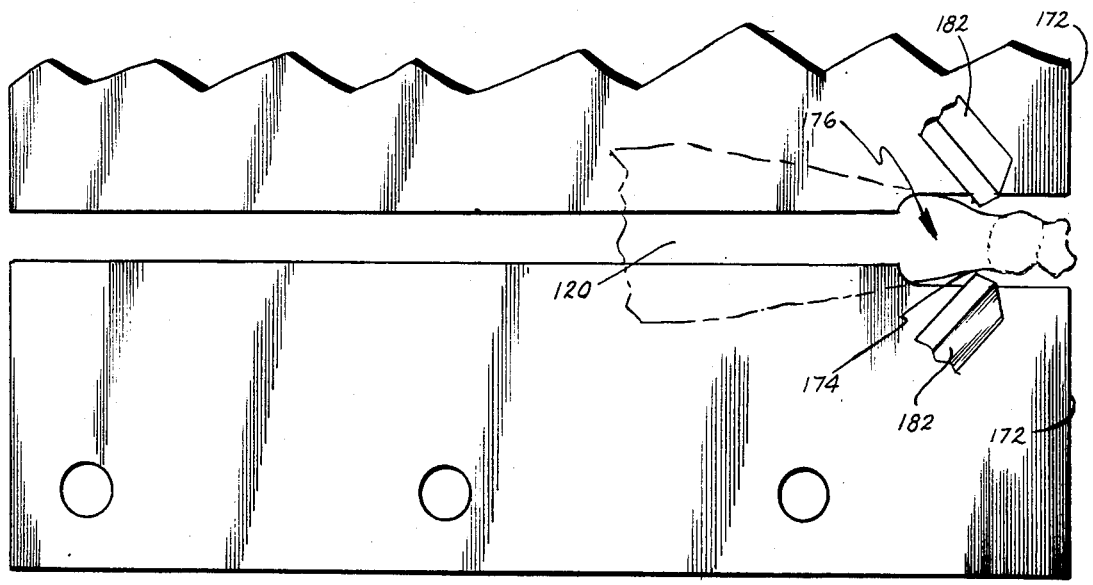
FIG. 15 is a fragmentary, top plan view of the peel-down or squeegee subassembly.

After passing through hold-down subassembly 60, poultry part 120 enters or passes through a squeegee or finish peel-down subassembly generally designated 62. As best seen in FIGS. 4, 6 and 15, squeegee subassembly 62 includes a subframe 160 having a pair of spaced mounting plates 162, 164. Bolted or otherwise suitably secured to mounting plates 162, 164 is a pair of squeegee plates 166. Plates 166, as seen in FIGS. 6 and 15, are positioned with opposed lateral edges 168 in spaced parallel relationship to define a peel-down slot 170.

Ends 172 of plates 166 are notched as 174 to define an enlarged portion 176 for slot 170.

Figure 7:
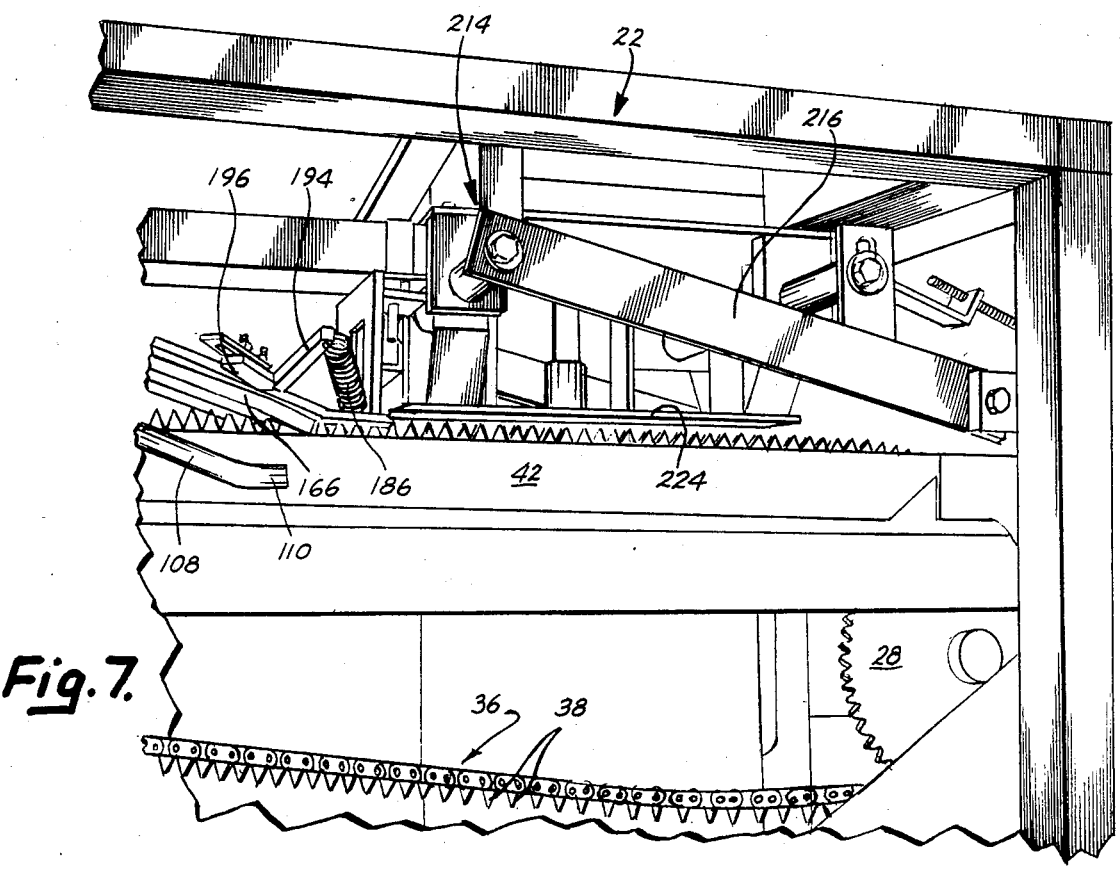
FIG. 7 is a fragmentary, perspective view showing a portion of the peel-down subassembly and the cutter subassembly.

Supported on mounting plates 162, 164 are scraper blade assemblies 180. Each assembly 180 includes a scraper knife 182 adjustably and pivotally mounted on plate 162 or 164 by fastener 184 and a support 196. A coil spring 186 has an end 188 fixed to frame 12 at a pin 190. Opposite end 192 of coil spring 186 is fixed to a lever 194. Lever 194 engages the knife support 196 (FIG. 7). Spring 186 biases the scoring knife 182 into the enlarged portion 176 of slot 170. Knives 182 will engage poultry part 120 along the lateral sides thereof, as schematically shown in FIG. 15, as the part passes through slot portion 176.

Figure 20:
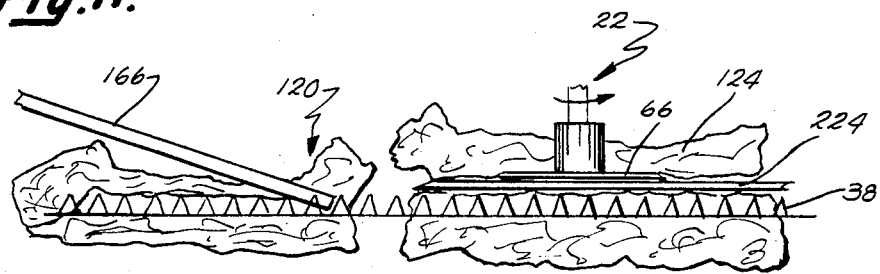
FIG. 20 is a fragmentary, side elevational view schematically illustrating a portion of the peel-down subassembly and the cutter subassembly.

As best seen in FIGS. 6 and 7, the squeegee plates 166 are supported above the conveyor at an incline with respect to the upper run of the conveyor. Plates 166 are angled downwardly with the lateral edges of the plates at slot portion 176 overlying the sides of the chain and the drive dogs. As schematically shown in FIG. 20, poultry part 120 will pass through slot 170 and enlarged slot portion 176. As the part passes through the slot, the lateral edges of the plates will move along the lateral sides of the part in a wiping or peeling fashion to complete the peel-down operation. The scoring knives 182 assist in separating the meat from the bone by scoring along the lateral sides of the bone as it passes through the squeegee. The plates are formed from a plastic material, such as urethane. The plates peel or fold down the meat along the lateral sides of the bone by wiping the bone in a manner similar to that of a squeegee. The specific angle of the plates with respect to the conveyor chain is not believed to be critical. It is merely important that the plates be angled sufficiently so that the poultry piece will come in contact with the lateral edges of the plates along the entire lateral sides of the poultry part.

CUTTING SUBASSEMBLY

After the poultry part passes through the squeegee subassembly 62, the meat has been folded down along the lateral edges until it is retained on the bone principally along the lower longitudinal edge of the bone. The meat will be secured to the bone and overlie both sides of the upper run of the conveyor. The bone, after leaving the squeegee subassembly, then enters the cutting subassembly 22 of the apparatus. Subassembly 22 is best seen in FIGS. 7, 8, 9 and 10. The subassembly is also schematically illustrated in FIG. 20.

Figure 8:
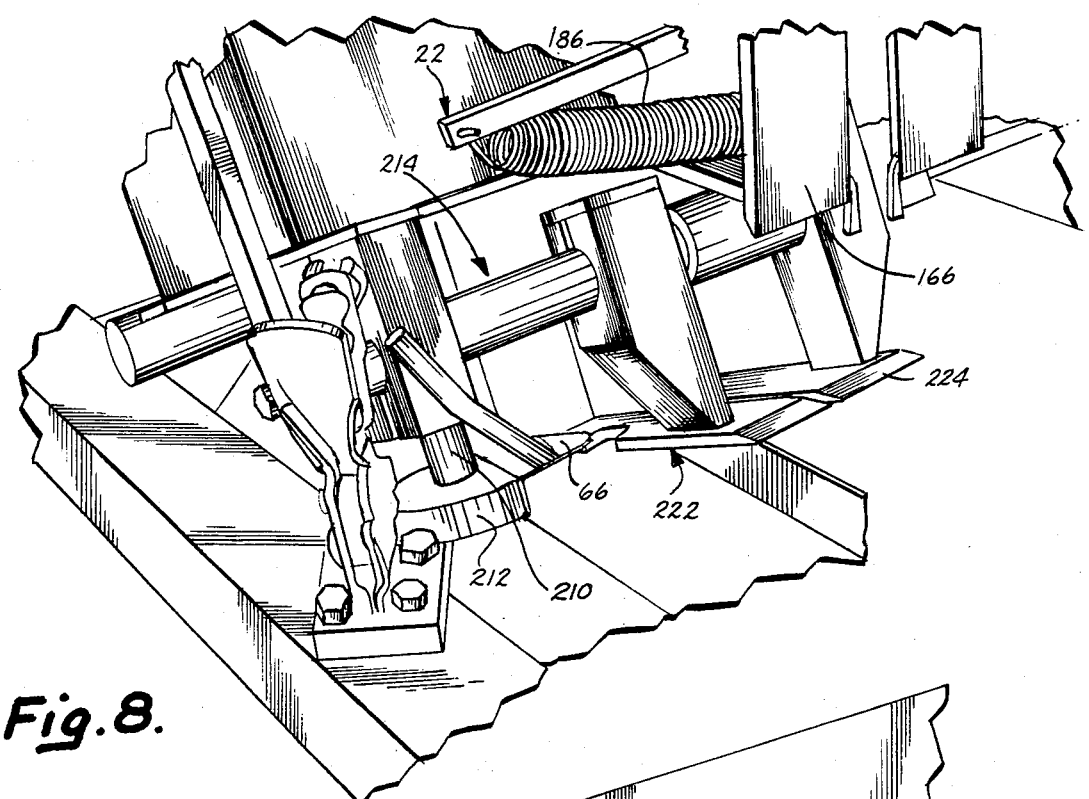
FIG. 8 is a fragmentary, perspective view showing the cutter subassembly.
Figure 9:
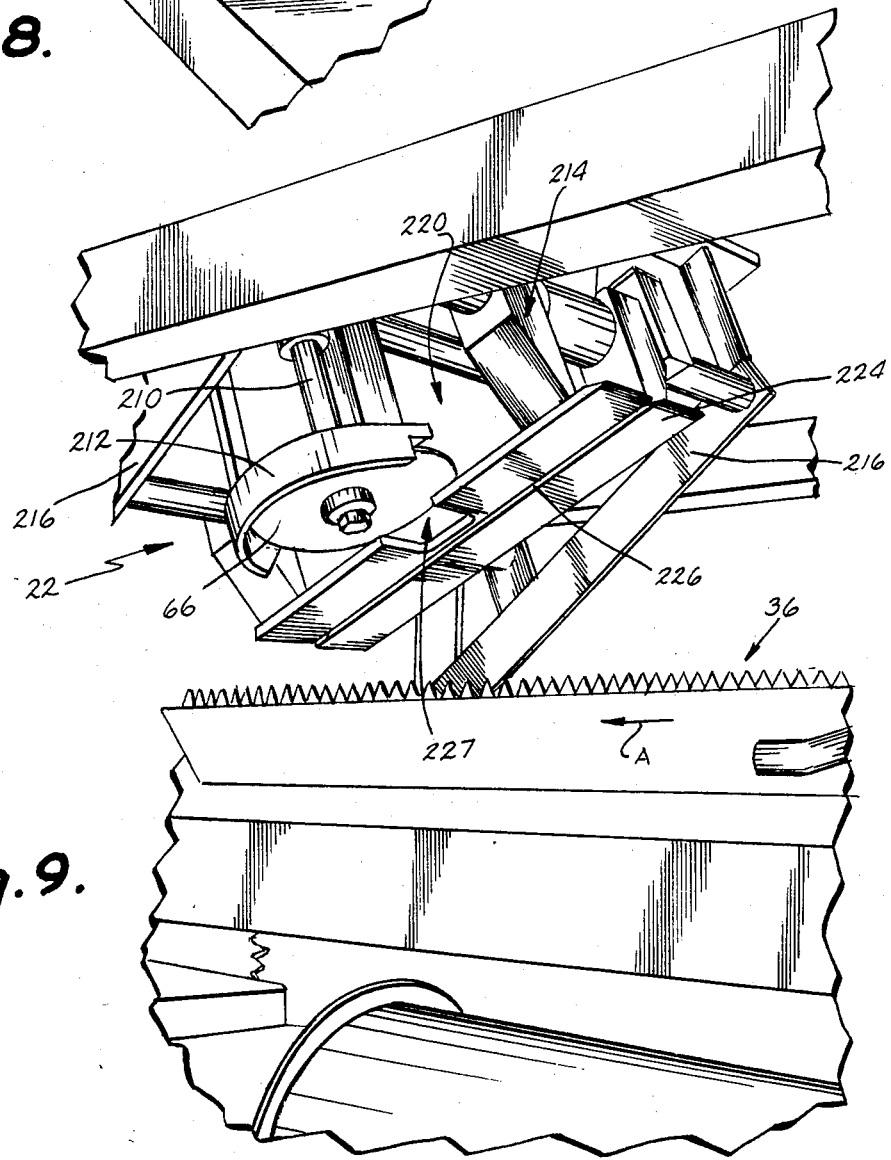
FIG. 9 is a fragmentary, perspective view showing the cutter subassembly.
Figure 10:
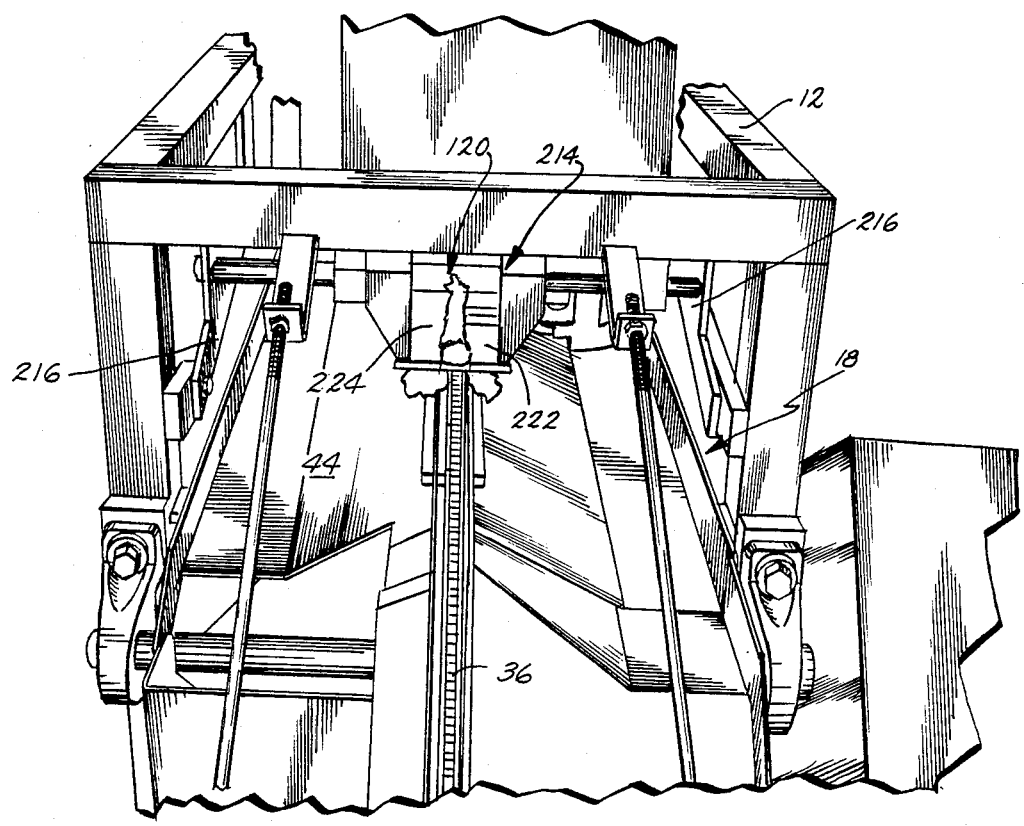
FIG. 10 is a fragmentary, perspective view showing the discharge end of the apparatus.

As seen in FIGS. 8 and 9, subassembly 22 includes a rotary cutter or blade 66 fixed to drive shaft 210 of drive motor 68. A blade guard 212 is positioned around blade 66. Cutter blade 66 is mounted for movement towards and away from conveyor chain 36 in a direction generally perpendicular to the longitudinal direction of movement of chain 36 which is moving in a direction indicated by arrow A (FIG. 9). The entire subassembly 22 is supported on a subframe 214 which is secured to pivoting links 216. Frame structure 214 and links 216 permit the entire cutter subassembly to be pivoted up and away from chain 36 for cleaning purposes, as illustrated in FIGS. 8 and 9.

Figure 16:
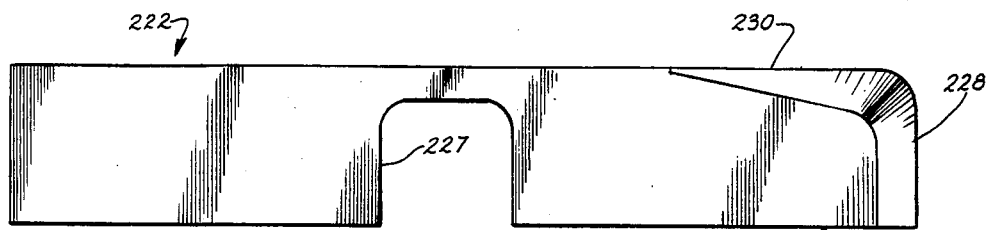
FIG. 16 is a top, plan view of a ramp plate.
Figure 17:
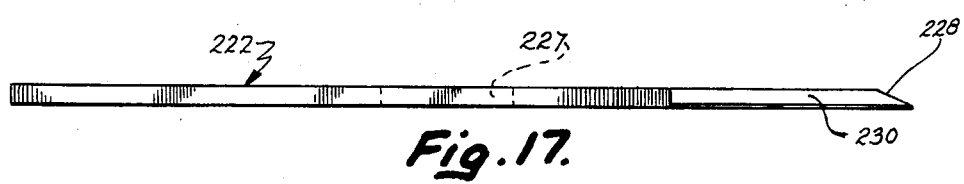
FIG. 17 is a right-side, elevational view of the ramp plate of FIG. 16.
Figure 19:
FIG. 19 is a side elevational view of the ramp plate of FIG. 18.
Figure 18:
FIG. 18 is a top, plan view of another ramp plate.

Subassembly 22 further includes a ramp structure 220. Ramp 220 has a pair of plates 222, 224 mounted in opposed, spaced, parallel relationship to define a guide slot 226. Guide slot 226 defined by the plates overlies the longitudinal centerline of conveyor chain 36 when in the position shown in FIG. 7. As seen in FIGS. 16 and 17, plate 222 includes a recess 227 to receive shaft 210 when cutter blade 66 is moved into position. Each of the plates 222, 224 includes a beveled leading edge 228 which extends along lateral edge 230 and into the leading or opening portion of slot 226.

When the cutting assembly is in position overlying chain 36, the poultry piece is moved into engagement with the ramp so that the bone is forced over the top surface of the ramp. The folded down or peeled down meat is forced through the guide slot 226. The rotary guide blade 66 overlies slot 226 and is positioned beneath bone 124 of the piece. The rotary cutter severs the meat from the bone as it passes across plates 222, 224. Conveyor dogs 38 in engagement with the meat force the bone through the cutting subassembly. The meat falls into the catch pan 44. The bone is conveyed by the conveyor chain 36 to the discharge chute 46.

OPERATION

In view of the foregoing description, the operation of the deboner in accordance with the present invention should be readily apparent to one of ordinary skill in the poultry processing art. The deboner, while principally developed to remove meat from an elongated turkey thigh bone, would be usable to remove meat from other elongated poultry parts, including drumsticks, chicken parts and the like.

In use, the conveyor chain drive and the cutter motor are activated through conventional controls positioned within the control box 50. The thigh piece is initially prepared by loosening the meat from a large knuckel or end. The operator inserts the large end into cup knife 80 which is driven by cup knife motor 78. The initial preparation involves loosening of the meat and cutting of the tendons at the large end of the bone. Due to a natural curvature of the bone from the small end to the large end, this step insures better yields. When the bone passes through the squeegee, since it is curved, both lateral sides are not wiped as efficiently. Loosening of the meat at the big end counteracts this problem and increases yield or meat removal.

The operator then positions the thigh piece with the white knuckle up on feed tray 24. The piece is inserted between guide bars 102, 104 of the first pair of bars. The bars center the piece on the conveyor. Dogs 38 on the conveyor chain engage the poultry piece and transport it through the hold-down subassembly 60. As the piece moves through the hold-down subassembly, angled portions 108 of the guide bars contact the meat and in a progressive fashion begin folding the meat down and along the lateral sides of the longitudinally extending bone. The thigh piece is contacted by scoring knives 132. This cutting along an upper longitudinal edge increases the efficiency of the folding down of the meat as it passes through the hold-down subassembly.

After the initial rough folding down, the final or finish peeling is accomplished as the piece passes through the squeegee or final peel-down subassembly 62. The enlargement 176 in the peel-down slot 170 provides room for the knuckle, as well as the trailing end of the bone to pass.

The spring biased knives 182 at enlarged portion 176 of slot 170 ride along the lateral edges or sides of the bone. This increases the efficiency of the squeegee operation. Due to the angular relationship of the squeegee with respect to the plane of travel of the conveyor, the lateral edges of the squeegee plates engage the meat and, in effect, wipe down along the lateral sides of the bone. This accomplishes a finish or final fold down of the meat until it is retained on the bone principally along the lower longitudinal edge of the bone.

As the piece passes through the squeegee subassembly, the small end engages the beveled ramp portion of plates 222, 224. This is schematically shown in FIG. 20. The bone is propelled over the upper surface of the plates and the meat is forced through the slot 226. The rotating cutter blade 66 overlies slot 226. The blade rotates under the lower longitudinal edge of the bone and severs the peeled down meat. The meat then falls along each side of the conveyor into catch pan 44. The bone then exits the conveyor at the discharge end and falls into discharge chute 46.

In a presently existing embodiment of the deboner in accordance with the present invention, hold-down rods 102, 104 are formed from stainless steel and have a diameter of approximately 0.6 inches. Portion 106 of the leading pair of rods has a length of approximately 11 inches. Portions 108 of each rod 102, 104 have a length of approximately 4 inches, and trailing ends 110 have a length of approximately 1 inch. Portions 106 of the second and third pairs of rods 102, 104 have a length of approximately 6.5 inches. The distance between the centers of the first and second pairs of hold-down rods 102, 104 at the trailing ends 110 is approximately 3.75 inches. The distance between the centers of the final set of hold-down rods or guide rods at their trailing ends is approximately 4.75 inches. The distance between the side plates 100 at their opposed surfaces or faces is approximately 0.75 inches. Portions 108 of each guide rod 102, 104 are angled at an angle designated B in FIG. 14 of approximately 25 degrees.

The squeegee plates 166 are fabricated from ⅜ inch thick 80 Durometer urethane which is USDA approved. Presently existing squeegees have an overall length of approximately 7 inches and an overall width of approximately 2 inches. The spacing or transverse dimension of slot 170 may be adjusted to accommodate the size of product being passed through the deboner. The plates are positioned so that the bone ends will pass through the enlarged portion 176.

The ramp plates 222, 224 are fabricated from ¼×2 inch stainless steel. The plates have an overall length of approximately 12 inches. The taper or ramp portion at the leading edge of the plates extends into the slot approximately 3.25 inches. Satisfactory operation has been obtained with the plates positioned so that the slot 226 defined therebetween is approximately 3/32 of an inch. The rotary cutting blade 66 has an approximately 4 inch diameter blade.

The deboner in accordance with the present invention efficiently removes the meat from an elongated poultry piece. The portion of the bone which is fed into the machine, in effect, guides or stabilizes the part as it moves through the machine. The white knuckle and the trailing end of the bone are contacted and retained by the hold-down bar assembly. The squeegee plates effectively engage and wipe the lateral edges of the bone so that the meat is positioned in a tucked-in manner along the lower longitudinal edge. The apparatus efficiently handles different sized poultry pieces. The apparatus is adjustable to accommodate different parts, including turkey parts and chicken parts.

In view of the foregoing description, those of ordinary skill in the art will undoubtedly envision various modifications to the present invention which will not depart from the scope thereof. It is expressly intended, therefore, that the true spirit and scope of the present invention should be determined by reference to the appended claims.

The embodiments of the invention in which an exclusive property or privilege is claimed are defined as follows:

1. A deboner apparatus for removing the meat from a poultry thigh bone, said apparatus comprising:
    an elongated conveyor defining an upper run having a feed end and a discharge end, said conveyor including a plurality of dogs adapted to engage the bone of a poultry thigh;
    a guide rail assembly extending from a point adjacent the feed end towards the discharge end for holding the thigh on the conveyor and initially folding meat from the thigh bone;
    a peel-down assembly positioned downstream of said guide rail assembly and along said conveyor, said peel-down assembly defining an elongated slot positioned at an angle with respect to said upper run of said conveyor so that as the thigh bone passes through the slot, the edges of the slot progressively pass along the sides of the bone to peel the meat until the meat is retained on the bone along the lower edge of the bone; and
    a cutting assembly positioned downstream of said peel-down assembly and wherein said cutting assembly includes a cutting blade positioned along a lower edge of the thigh bone for cutting the meat from the lower edge of the bone after the bone has passed through said peel-down assembly.

2. A deboner apparatus as defined by claim 1 wherein said guide rail assembly includes a plurality of elongated rods, each rod having a portion angled towards the conveyor along a side of the conveyor, said angled portion contacting the meat and initially peeling the meat down and away from an upper edge of the bone.

3. A deboner apparatus as defined by claim 1 wherein said peel-down assembly comprises:
    a pair of elongated plates and means supporting said plates with opposed lateral edges in spaced parallel relationship to define said peel-down slot.

4. A deboner apparatus as defined by claim 3 further including a pair of knives supported at said peel-down assembly at said slot to cut the meat on the bone as it passes through said slot and biasing means engaging said knives for biasing said knives towards said slot and against said thigh bone.

5. A deboner apparatus as defined by claim 1 further including an upper edge scoring knife adjacent said guide rail assembly for scoring the poultry thigh along an upper edge thereof as said thigh moves through said guide rail assembly to aid in the folding of meat from the thigh bone.

6. A deboner apparatus as defined by claim 5 further including biasing means engaging said scoring knife for biasing said scoring knife into contact with said thigh.

7. A deboner apparatus as defined by claim 3 wherein said guide rail assembly includes a plurality of elongated rods, each rod having a portion angled towards the conveyor along a side of the conveyor, said angled portion contacting the meat and initially peeling the meat down and away from an upper edge of the bone.

8. A deboner apparatus for removing the meat from a poultry thigh bone, said apparatus comprising:
    an elongated conveyor defining an upper run having a feed end and a discharge end, said conveyor including a plurality of dogs adapted to engage the bone of a poultry thigh;

a guide rail assembly extending from a point adjacent the feed end towards the discharge end for holding the thigh on the conveyor and initially folding meat from the thigh bone;

a peel-down assembly positioned downstream of said guide rail assembly and along said conveyor, said peel-down assembly defining an elongated slot positioned at an angle with respect to said upper run of said conveyor so that as the thigh bone passes through the slot, the edges of the slot progressively pass along the sides of the bone to peel the meat until the meat is retained on the bone along the lower edge of the bone; and a cutting assembly positioned downstream of said peel-down assembly for cutting the meat from the lower edge of the bone, said cutting assembly comprising a rotary cutting blade positioned to rotate along the lower edge of the thigh bone to cut the meat therefrom.

9. A deboner apparatus as defined by claim 8 wherein said cutting assembly further includes:

a pair of elongated, spaced guide plates defining an elongated guide slot positioned below the thigh bone and aligned generally with the lower edge of the bone and through which the peeled down meat extends, said rotary cutting blade positioned to overlie said guide slot.

10. A deboner apparatus for removing the meat from a poultry thigh bone, said apparatus comprising:

an elongated conveyor defining an upper run having a feed end and a discharge end, said conveyor including a plurality of dogs adapted to engage the bone of a poultry thigh;

a guide rail assembly extending from a point adjacent the feed end towards the discharge end for holding the thigh on the conveyor and initially folding meat from the thigh bone;

a peel-down assembly positioned downstream of said guide rail assembly and along said conveyor, said peel-down assembly defining an elongated slot positioned at an angle with respect to said upper run of said conveyor so that as the thigh bone passes through the slot, the edges of the slot progressively pass along the sides of the bone to peel the meat until the meat is retained on the bone along the lower edge of the bone; and a cutting assembly positioned downstream of said peel-down assembly for cutting the meat from the lower edge of the bone, said guide rail assembly including a plurality of elongated rods, each rod having a portion angled towards the conveyor along a side of the conveyor, said angled portion contacting the meat and initially peeling the meat down and away from an upper edge of the bone and wherein said cutting assembly comprises a rotary cutting blade positioned to rotate along the lower edge of the thigh bone to cut the meat therefrom.

11. A deboner apparatus as defined by claim 10 wherein said cutting assembly further includes:

a pair of elongated, spaced guide plates defining an elongated guide slot positioned below the thigh bone and aligned generally with the lower edge of the bone and through which the peeled down meat extends, said rotary cutting blade positioned to overlie said guide slot.

12. A deboner apparatus for removing the meat from a poultry thigh bone, said apparatus comprising:

an elongated conveyor defining an upper run having a feed end and a discharge end, said conveyor including a plurality of dogs adapted to engage the bone of a poultry thigh;

a guide rail assembly extending from a point adjacent the feed end towards the discharge end for holding the thigh on the conveyor and initially folding meat from the thigh bone;

a peel-down assembly positioned downstream of said guide rail assembly and along said conveyor, said peel-down assembly defining an elongated slot positioned at an angle with respect to said upper run of said conveyor so that as the thigh bone passes through the slot, the edges of the slot progressively pass along the sides of the bone to peel the meat until the meat is retained on the bone along the lower edge of the bone; and a cutting assembly positioned downstream of said peel-down assembly for cutting the meat from the lower edge of the bone, said peel-down assembly comprising:

a pair of elongated plates and means supporting said plates with opposed lateral edges in spaced parallel relationship to define said peel-down slot and wherein said cutting assembly comprises a rotary cutting blade positioned to rotate along the lower edge of the thigh bone to cut the meat therefrom and wherein said apparatus includes a scoring knife adjacent said guide rail assembly for scoring the thigh along an upper edge thereof.

13. A deboner apparatus as defined by claim 12 wherein said cutting assembly further includes:

a pair of elongated, spaced guide plates defining an elongated guide slot positioned below the thigh bone and aligned generally with the lower edge of the bone and through which the peeled down meat extends, said rotary cutting blade positioned to overlie said guide slot.

14. A deboner apparatus as defined by claim 13 wherein said guide rail assembly includes a plurality of elongated rods, each rod having a portion angled towards the conveyor along a side of the conveyor, said angled portion contacting the meat and initially peeling the meat down along lateral sides of the bone and away from an upper edge of the bone.

15. A deboner apparatus as defined by claim 13 further including a pair of knives supported at said peel-down assembly at said slot to cut the meat on the bone as it passes through said slot and biasing means engaging said knives for biasing said knives towards said slot and against said thigh bone.

16. A deboner apparatus as defined by claim 13 further including biasing means engaging said scoring knife for biasing said scoring knife into contact with said thigh.

17. A deboner apparatus as defined by claim 15 further including biasing means engaging said scoring knife for biasing said scoring knife into contact with said thigh.

18. An apparatus for peeling or folding away meat from an elongated bone of a poultry part, said apparatus comprising:

an elongated frame having a longitudinal axis;

an elongated conveyor extending along the longitudinal axis of said frame for moving the part along said axis;

peel-down means extending along said conveyor on said frame for engaging a part moving along said conveyor and peeling the meat away from the bone until meat is retained on the bone along a longitudinal edge of the bone adjacent said conveyor; and cutting means positioned across said conveyor downstream of said peel-down means for severing the meat from the longitudinal edge of the bone, said cutting means defining a guide slot extending along the longitudinal axis of the frame and including a cutting blade positioned to overlie said guide slot and to be along a lower edge of the bone.

19. An apparatus as defined by claim 18 wherein said peel-down means comprises:

a pair of peel-down plates adjacent said cutting means having parallel, opposed lateral edges defining a peel-down slot angled with respect to said conveyor and the bone so that the meat on the part is forced into engagement with the lateral edges as it is moved through the slot by said conveyor and peeled to the longitudinal edge of the bone before the part enters the cutting means.

20. An apparatus as defined by claim 19 further including:

a pair of knife blades adjacent said peel-down plates and having cutting edges overlying said slot to engage the part passing through the slot.

21. An apparatus as defined by claim 18 wherein said peel-down means includes:

a hold-down bar assembly extending along the conveyor for engaging the part, holding the part on the conveyor and initially peeling meat from the bone along the sides of the bone.

22. An apparatus as defined by claim 21 wherein said hold-down bar assembly comprises:

a first elongated bar extending above and along a side of the conveyor; and a second elongated bar extending above and along another side of said conveyor opposite said first bar, each of said bars including an elongated first straight portion and a trailing portion angled towards said conveyor, said trailing portion engaging the meat and folding the meat away from the bone.

23. An apparatus as defined by claim 21 further including a scoring knife positioned spaced from said conveyor to engage the part as it is engaged by said hold-down assembly.

24. An apparatus as defined by claim 22 further including a scoring knife positioned spaced from said conveyor to engage the part as it is engaged by said hold-down assembly.

25. An apparatus as defined by claim 19 wherein said peel-down means includes:

a hold-down bar assembly extending along the conveyor for engaging the part, holding the part on the conveyor and initially peeling meat from the bone along the sides of the bone.

26. An apparatus as defined by claim 25 wherein said hold-down bar assembly comprises:

a first elongated bar extending above and along a side of the conveyor; and a second elongated bar extending above and along another side of said conveyor opposite said first bar, each of said bars including an elongated first straight portion and a trailing portion angled towards said conveyor, said trailing portion engaging the meat and folding the meat away from the bone.

27. An apparatus as defined by claim 26 further including a scoring knife positioned spaced from said conveyor to engage the part as it is engaged by said hold-down assembly.

28. An apparatus as defined by claim 25 further including:

a pair of knife blades adjacent said peel-down plates and having cutting edges overlying said slot to engage the part passing through the slot.

29. An apparatus for peeling or folding away meat from an elongated bone of a poultry part, said apparatus comprising:

an elongated frame having a longitudinal axis;

an elongated conveyor extending along the longitudinal axis of said frame for moving the part along said axis;

peel-down means extending along said conveyor on said frame for engaging a part moving along said conveyor and peeling the meat away from the bone until meat is retained on the bone along a longitudinal edge of the bone adjacent said conveyor; and cutting means positioned across said conveyor downstream of said peel-down means for severing the meat from the longitudinal edge of the bone and wherein said cutting means comprises:

a pair of ramp plates having opposed lateral edges in spaced parallel relationship to define a slot through which the meat along the longitudinal edge of the bone extends, said plates positioned between the bone and the conveyor; and a rotary cutter having a blade overlying said slot for severing the meat from the bone.

30. An apparatus as defined in claim 29 wherein each of said ramp plates defines a tapered leading edge defining an entrance to said slot so that as said thigh bone engages said plates, it is moved away from said conveyor and the meat is forced through the slot and positioned to be cut by said blade.

31. An apparatus as defined by claim 29 wherein said peel-down means comprises:

a pair of peel-down plates adjacent said cutting means having parallel, opposed lateral edges defining a peel-down slot angled with respect to said conveyor and the bone so that the meat on the part is forced into engagement with the lateral edges as it is moved through the slot by said conveyor and peeled down to the longitudinal edge of the bone before the part enters the cutting means.

32. An apparatus as defined by claim 31 further including:

a pair of knife blades adjacent said peel-down plates and having cutting edges overlying said slot to engage the part passing through the slot.

33. An apparatus as defined by claim 31 wherein each of said ramp plates defines a tapered leading edge defining an entrance to said slot so that, as said bone engages said plates, it is moved away from said conveyor and the meat is forced through the slot and positioned to be cut by said blade.

34. An apparatus as defined by claim 32 wherein each of said ramp plates defines a tapered leading edge defining an entrance to said slot so that as said bone engages said plates, it is moved away from said conveyor and the meat is forced through the slot and positioned to be cut by said blade.

35. An apparatus as defined by claim 29 wherein said peel-down means includes:
a hold-down bar assembly extending along the conveyor for engaging the part, holding the part on the conveyor and initially peeling meat from the bone along the sides of the bone.

36. An apparatus as defined by claim 35 wherein said hold-down bar assembly comprises:
a first elongated bar extending above and along a side of the conveyor; and
a second elongated bar extending above and along another side of said conveyor opposite said first bar, each of said bars including an elongated first straight portion and a trailing portion angled towards said conveyor, said trailing portion engaging the meat and folding the meat away from the bone.

37. An apparatus as defined by claim 36 further including a scoring knife positioned spaced from said conveyor to engage the part as it is engaged by said hold-down assembly.

38. An apparatus as defined by claim 35 wherein each of said ramp plates defines a tapered leading edge defining an entrance to said slot so that as said bone engages said plates, it is moved away from said conveyor and the meat is forced through the slot and positioned to be cut by said blade.

39. An apparatus as defined by claim 37 wherein each of said ramp plates defines a tapered leading edge defining an entrance to said slot so that as said bone engages said plates, it is moved away from said conveyor and the meat is forced through the slot and positioned to be cut by said blade.

40. An apparatus for peeling or folding away meat from an elongated bone of a poultry part, said apparatus comprising:
an elongated frame having a longitudinal axis;
an elongated conveyor extending along the longitudinal axis of said frame for moving the part along said axis;
peel-down means extending along said conveyor on said frame for engaging a part moving along said conveyor and peeling the meat away from the bone until meat is retained on the bone along a longitudinal edge of the bone adjacent said conveyor; and
cutting means positioned across said conveyor downstream of said peel-down means for severing the meat from the longitudinal edge of the bone, said peel-down means comprising:
a pair of peel-down plates adjacent said cutting means having parallel, opposed lateral edges defining a peel-down slot angled with respect to said conveyor and the bone so that the meat on the part is forced into engagement with the lateral edges as it is moved through the slot by said conveyor and peeled to the longitudinal edge of the bone before the part enters the cutting means, said peel-down means further including:
a hold-down bar assembly extending along the conveyor for engaging the part, holding the part on the conveyor and initially peeling meat from the bone along the sides of the bone, said hold-down bar assembly comprising:
a first elongated bar extending above and along a side of the conveyor; and
a second elongated bar extending above and along another side of said conveyor opposite said first bar, each of said bars including an elongated first straight portion and a trailing portion angled towards said conveyor, said trailing portion engaging the meat and folding the meat away from the bone;
a scoring knife positioned spaced from said conveyor to engage the part as it is engaged by said hold-down assembly; and
a pair of knife blades adjacent said peel-down plates and having cutting edges overlying said slot to engage the part passing through the slot.

* * * * *